United States Patent
Runde et al.

(10) Patent No.: US 8,662,561 B2
(45) Date of Patent: Mar. 4, 2014

(54) MULTI-FUNCTION REAR SEAT STRUCTURE MECHANISM

(75) Inventors: David M. Runde, Beverly Hills, MI (US); Peter Paul Zeimis, III, Shelby Township, MI (US)

(73) Assignee: Magna Seating Inc., Aurora, Ontario (CA)

( * ) Notice: Subject to any disclaimer, the term of this patent is extended or adjusted under 35 U.S.C. 154(b) by 0 days.

(21) Appl. No.: 13/596,600

(22) Filed: Aug. 28, 2012

(65) Prior Publication Data

US 2013/0049425 A1 Feb. 28, 2013

Related U.S. Application Data

(60) Provisional application No. 61/528,835, filed on Aug. 30, 2011.

(51) Int. Cl.
*B60N 2/10* (2006.01)
*B60N 2/22* (2006.01)

(52) U.S. Cl.
USPC .................. 296/65.09; 296/65.03; 296/65.16; 297/343

(58) Field of Classification Search
USPC ......... 297/321, 334, 343, 316, 322, 324–326, 297/329, 335, 378.1, 378.12; 296/65.09, 296/65.03, 65.16
See application file for complete search history.

(56) References Cited

U.S. PATENT DOCUMENTS

| | | | |
|---|---|---|---|
| 5,393,116 A * | 2/1995 | Bolsworth et al. | ......... 296/65.03 |
| 5,671,948 A | 9/1997 | Susko et al. | |
| 6,883,854 B2 | 4/2005 | Daniel | |
| 7,559,594 B2 | 7/2009 | McMillen | |
| 7,568,764 B2 | 8/2009 | Harper et al. | |
| 7,611,200 B2 | 11/2009 | Jovicevic et al. | |
| 8,336,961 B2 * | 12/2012 | Zeimis et al. | ................. 297/335 |
| 8,408,648 B2 * | 4/2013 | Champ | ........................ 297/335 |
| 2008/0100112 A1 | 5/2008 | Hausler et al. | |

\* cited by examiner

*Primary Examiner* — Dennis Pedder
(74) *Attorney, Agent, or Firm* — Miller Canfield

(57) ABSTRACT

A seat assembly includes a seat cushion and seat back supported above a floor by a rear leg. The seat back is pivotally coupled to a recliner bracket. The seat cushion is selectively pivotally locked relative to the recliner bracket. A disc recliner operatively couples the recliner bracket and rear leg. The disc recliner allows the rear leg to pivot relative to the recliner bracket to move the seat assembly from a design seating position to a slouch position. The seat back is pivoted towards the seat cushion and the recliner allows the rear leg to pivot relative to the recliner bracket, thereby lowering the seat assembly to move the seat assembly to a fold and kneel position. The seat cushion is unlocked relative to the recliner bracket to pivot the seat cushion towards the seat back to move the seat assembly to a stadium position.

19 Claims, 10 Drawing Sheets

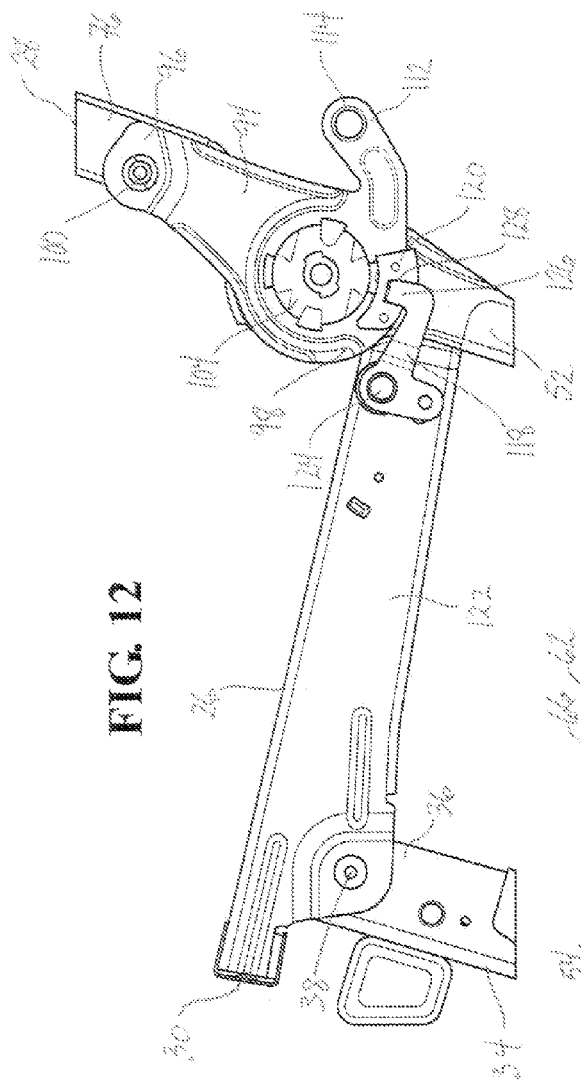
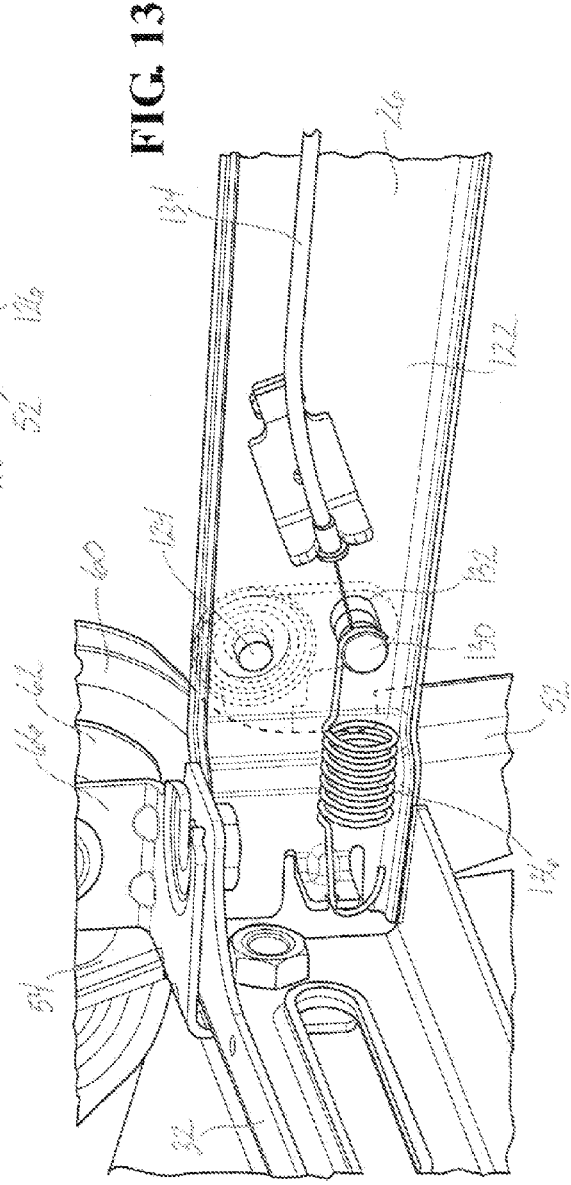

MULTI-FUNCTION REAR SEAT STRUCTURE MECHANISM

CROSS-REFERENCE TO RELATED APPLICATION

This application claims priority to and ail the benefits of U.S. Provisional Application Ser. No. 61/528,835, filed Aug. 30, 2011.

BACKGROUND OF THE INVENTION

1. Field of the Invention

The present invention relates to a seat assembly for an automotive vehicle. More particularly, the present invention relates to a rear seat assembly for a pick-up truck that is selectively movable between a design seating position, a plurality of slouch positions, a fold and kneel position, and a stadium position.

2. Description of Related Art

It is common for pick-up trucks to haw passenger cabins with one or more rear seal assemblies. The rear seat assemblies are positioned between a row of front seat assemblies and a rear wall of the cabin. In order to provide satisfactory passenger comfort for occupants using the rear seat assemblies, the rear seat assemblies may be positioned in a forward position relative to the rear wall of the cabin to provide sufficient space to allow for a reclining seat back of the rear seat assemblies. However, positioning the rear seat assemblies in the forward position decreases the amount of storage space available behind the row of front seat assemblies. Therefore, while it is desirable to provide a reclining seat back for the rear seat assemblies, it is also desirable to position the rear seat assemblies adjacent to the rear wall of the cabin to maximize storage space.

Several manufacturers provide rear seat assemblies adjacent to the rear wall of the cabin that allow the rear seat assemblies to "slouch", which effectively reclines the seat back. These rear seat assemblies are also operable to one or more stowed positions to increase the storage space available behind the row of front seat assemblies.

There remains, however, a need for a rear seat assembly for a cabin of a pick-up truck that simply and effectively maximizes passenger comfort and cabin storage space.

SUMMARY

According to one embodiment of the invention, a seat assembly for a motor vehicle includes a seat cushion and a seat back, A front leg extends between a first end pivotally coupled to the seat cushion and a second end releasably coupled to a floor of the vehicle. A rear leg extends between a first end pivotally coupled to the seat cushion and a second end pivotally coupled to the floor. The seat back is pivotally coupled to a recliner bracket The seat cushion is selectively locked to the recliner bracket to prevent pivotal movement of the seat cushion relative to the recliner bracket. A disc recliner operatively couples the recliner bracket and the second end of the rear leg. The disc recliner is selectively operable between a locked condition, preventing pivotal movement of the rear leg relative to the recliner bracket, and an unlocked condition, allowing pivotal movement of the rear leg relative to the recliner bracket. The disc recliner is actuated to the unlocked condition to allow the front and rear legs to pivot forwardly away from a back wall of the vehicle, thereby reclining the seat back as the seat assembly moves from design seating position to a slouch position. The seat back is pivoted towards the seat cushion and the recliner is actuated to the unlocked condition to allow the front and rear legs to pivot forwardly, thereby lowering the seat assembly towards the floor as the seat assembly moves from the design seating position to a fold and kneel position. The front leg is released from the floor and the seat cushion is unlocked relative to the recliner bracket to allow the seat cushion to pivot towards the seat back as the seat assembly moves from the design seating position to a stadium position.

BRIEF DESCRIPTION OF THE DRAWINGS

Other advantages of the present invention will be readily appreciated as the same becomes better understood by reference to the following detailed description when considered in connection with the accompanying drawings, wherein;

FIG. 12 is a fragmentary, side view of the rear scat assembly illustrating a cushion latch mechanism; and FIG. 13 is a fragmentary, inner perspective view of the rear seat assembly illustrating the cushion latch mechanism.

DETAILED DESCRIPTION OF THE EMBODIMENTS

Figure 1:
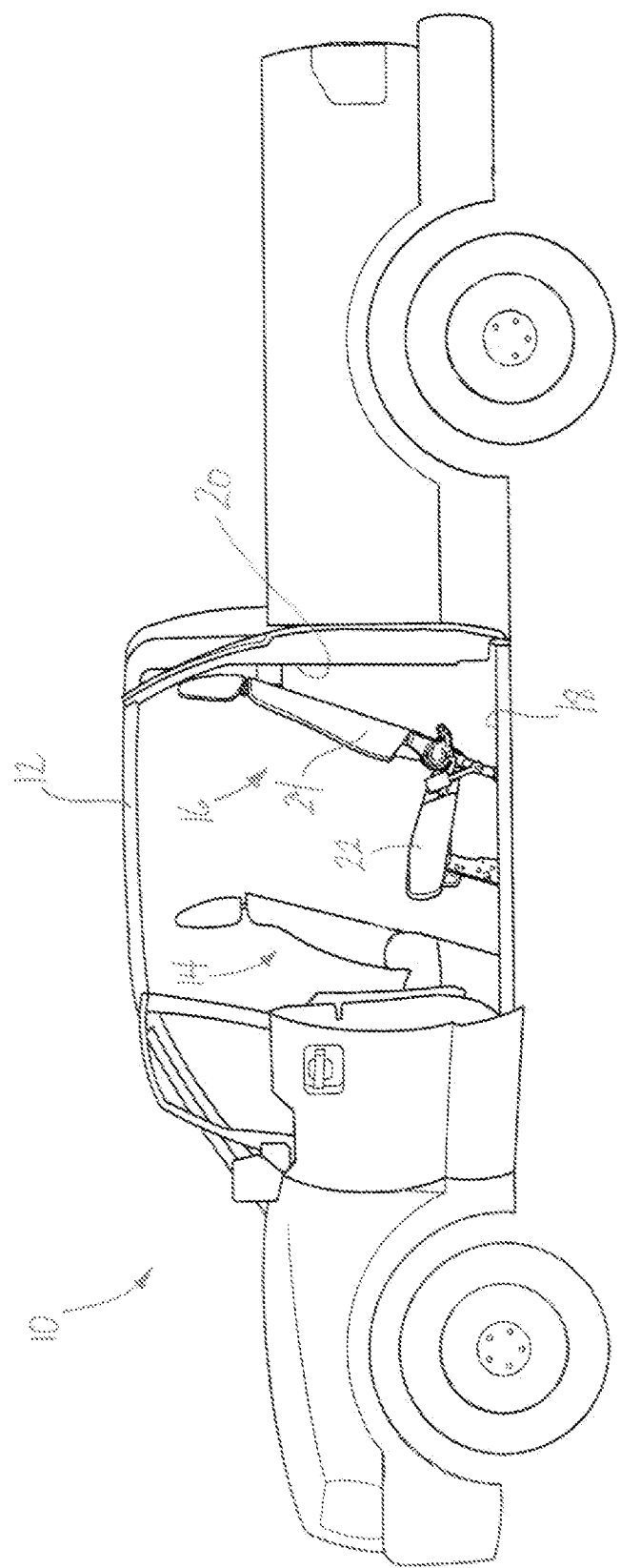
FIG. 1 is a side view of a pick-up truck including a rear seat assembly according to one embodiment of the invention.

Referring to the Figures, a pick-up truck 10 includes a passenger cabin 12 having a front seat assembly, generally shown at 14, and a rear seat assembly, generally shown at 16. Both the front seat assembly 14 and the rear seat assembly 16 are mounted on a floor 18 of the passenger cabin 12 and the rear seat assembly 16 is positioned adjacent a back wall 20 of the passenger cabin 12. While the rear seat assembly 16 is shown in the pick-up truck 10, it is appreciated that the rear seat assembly 16 may be used in a rear portion of any vehicle where space is at a premium and occupant comfort is desired.

The rear seat assembly 16, or seat assembly, as referred to herein, includes a seat cushion 22 and a seat back 24. As is well known in the art, the seat cushion 22 includes a foam pad covered in upholstery and supported by a seat cushion frame 26. Similarly, the seat back 24 includes a foam pad covered in upholstery and supported by a seat back frame 28. The seat cushion 22 and seat back 24 are operative coupled together as described in detail below.

Figure 6:
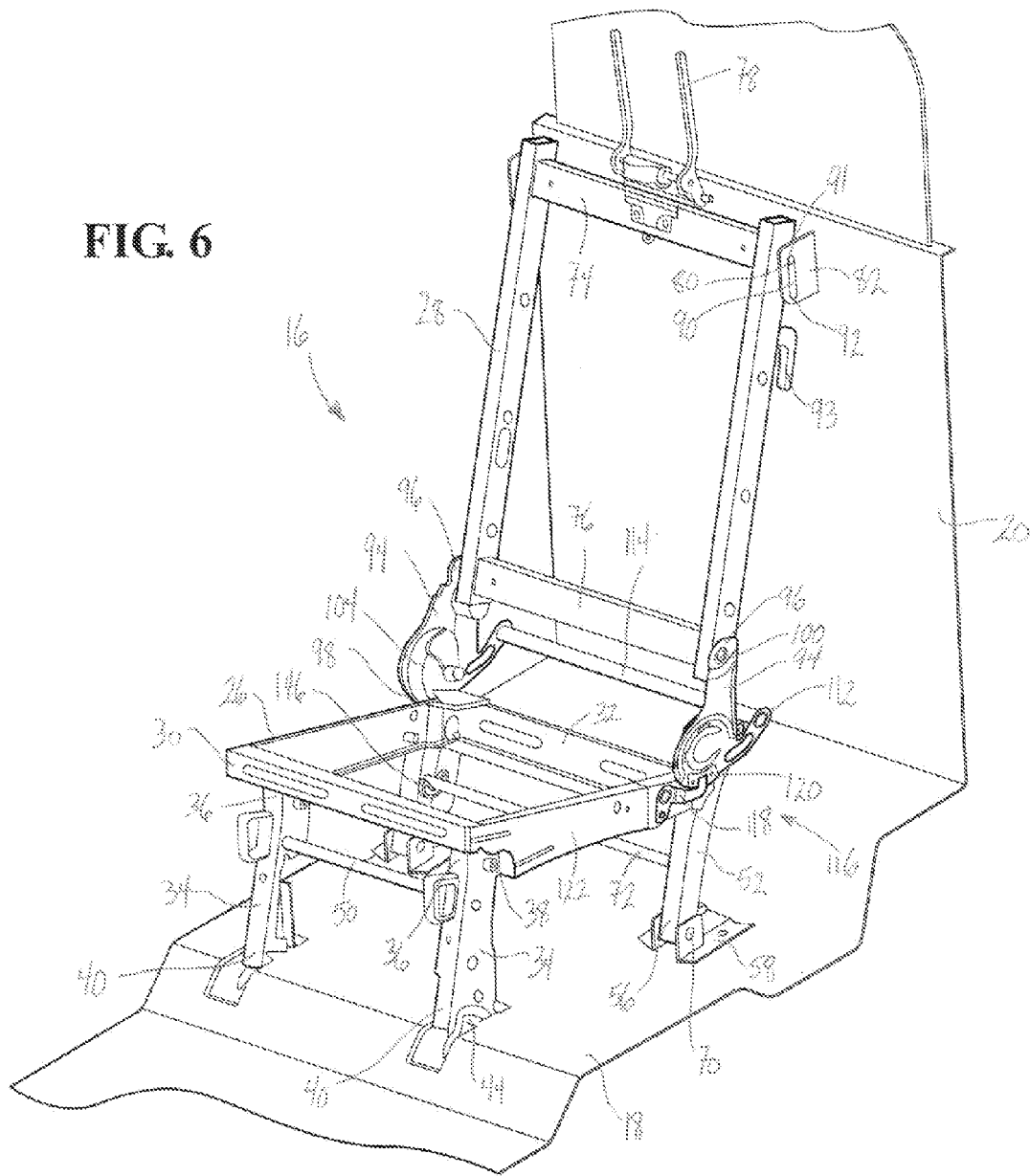
FIG. 6 is a perspective view of the rear seat assembly in the design seating position.

Referring to FIG. 6, the seat cushion frame 26 extends between a forward end 30 and a rearward end 32 and is supported above the floor 18 of the passenger cabin 12 by four pivotable legs. A pair of front legs 34 extends between a first end 36 pivotally coupled to the forward end 30 of the seat cushion frame 26 at pivot 38 and a second end 40 releasably coupled, to the floor 18. More specifically, the second end 40 of the front legs 34 includes a floor latch 42 that engages a floor striker 44 mounted on the floor 18 to secure the front legs 34 to the floor 18, best, seen in FIG. 7. The floor latches 42 are selectively operable to disengage from the floor strikers 44 to release the front legs 34 from the floor 18 in response to actuating a stadium release handle 46. The stadium release handle 46 is operatively coupled to each of the floor latches 42 with a Bowden-type cable 48. In one embodiment, the stadium release handle 46 is mounted generally at the forward end 30 of the seat cushion frame 26. It is appreciated, however, that the stadium release handle 46 may be mounted anywhere on the seat assembly 16 without varying from the scope of the invention. A cross-tube 50 extends between and couples the front legs 34 together to ensure the front legs 34 move in unison as described below.

Figure 8:
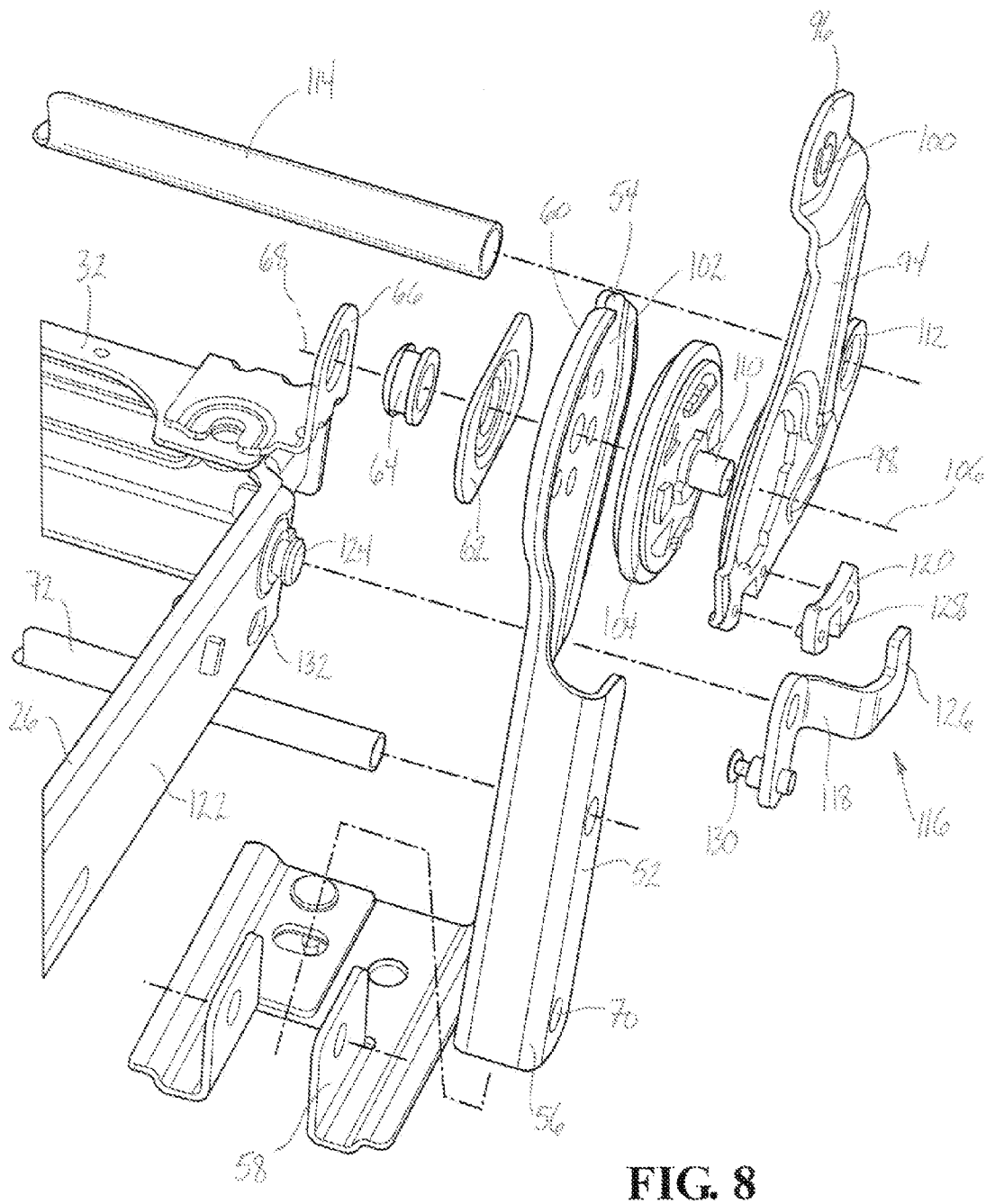
FIG. 8 is a fragmentary, partially exploded perspective view of the rear seat assembly.

A pair of rear legs 52 extends between a first end 54 pivotally coupled to the rearward end 32 of the seat cushion frame 26 and a second end 56 pivotally coupled to an attachment bracket 58 mounted on the floor 18. More specifically, an inner side 60 of the first end 54 of the rear legs 52 includes a bushing attachment bracket 62 fixedly secured thereto and a bushing 64 is fixedly secured to the bushing attachment bracket 62, as shown in FIG. 8. The rearward end 32 of the seat cushion frame 26 includes a pivot, bracket 66 that is fixedly thereto. The pivot bracket 66 is pivotally coupled to the bushing 64, thereby defining a cushion pivot axis 68. The seat cushion 22 pivots about the cushion pivot axis 68 as described below. The second end 56 of the rear legs 52 is pivotally coupled to the attachment bracket 58 at pivot 70. The seat assembly 16 may include a leg biasing spring (not shown) to urge the rear legs 52 about the pivot 70 in a rearward direction, towards the back wall 20, which is clockwise when viewed from FIG. 2. A cross-tube 72 extends between and couples the rear legs 52 together to ensure the rear legs 52 move in unison as described below.

Figure 10:
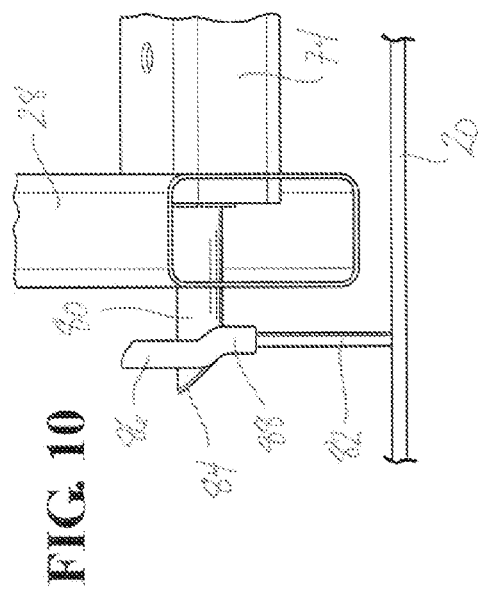
FIG. 10 is a top view of the latch pin engaged with the wall bracket.
Figure 11:
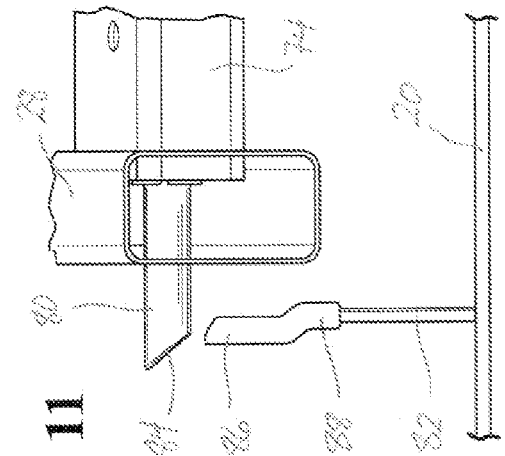
FIG. 11 is a top view of the latch pin disengaged from the wall bracket.
Figure 9:
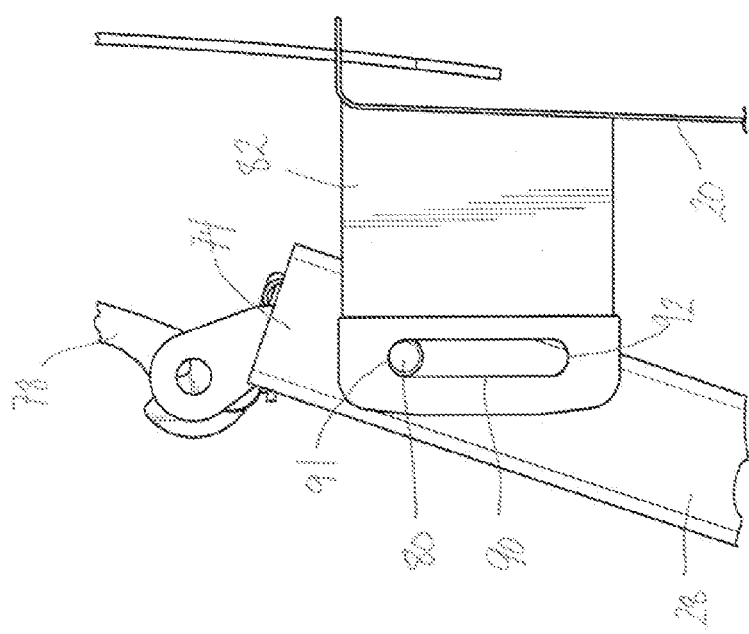
FIG. 9 is a side view of a latch pin engaged with a wall bracket.

The seat back frame 28 extends between an upper end 74 and a lower end 76. The upper end 74 of the seat back frame 28 may include a head restraint 78 operatively coupled thereto that is movable between an upright use position and a folded stowed position. The upper end 74 of the seat, back frame 28 is slidably and releasably coupled to the back wall 20 of the passenger cabin 12. More specifically, each side of the upper end 74 of the seat back frame 28 includes a latch pin 80 that is received in a wall bracket 82 mounted on the back wall 20 to secure the upper end 74 of the seat back frame 28 to the hack wall 20. The latch pins 80 include a distal end having a chamfered edge 84. When viewed from above, as shown in FIGS. 10 and 11, the wall brackets 82 include a stepped profile having an outer segment 86 and an inner segment 88. The outer segment 86 is farther from the seat back frame 28 relative to the inner segment 88. The wail brackets 82 also include an elongated vertical slot 90 that is located at a step between the outer segment 86 and the inner segment 88, as shown in FIG. 9. The slots 90 extend generally vertically between an upper end 91 and a lower end 92. The latch pins 80 are spring biased to an extended position protruding from the seat back frame 28 in a lateral direction. In the extended position, the latch pins 80 are adapted to engage the slots 90 in the wall brackets 82. The latch pins 80 are selectively retractable to disengage from the slots 90 in the wall brackets 82 to release the upper end 74 of the seat back frame 28 from the back wall 20 in response to actuating a fold flat release handle 93. The fold flat release handle 93 is operatively coupled to each of the latch pins 80 with a Bowden-type cable or linkage (not shown).

Figure 7:
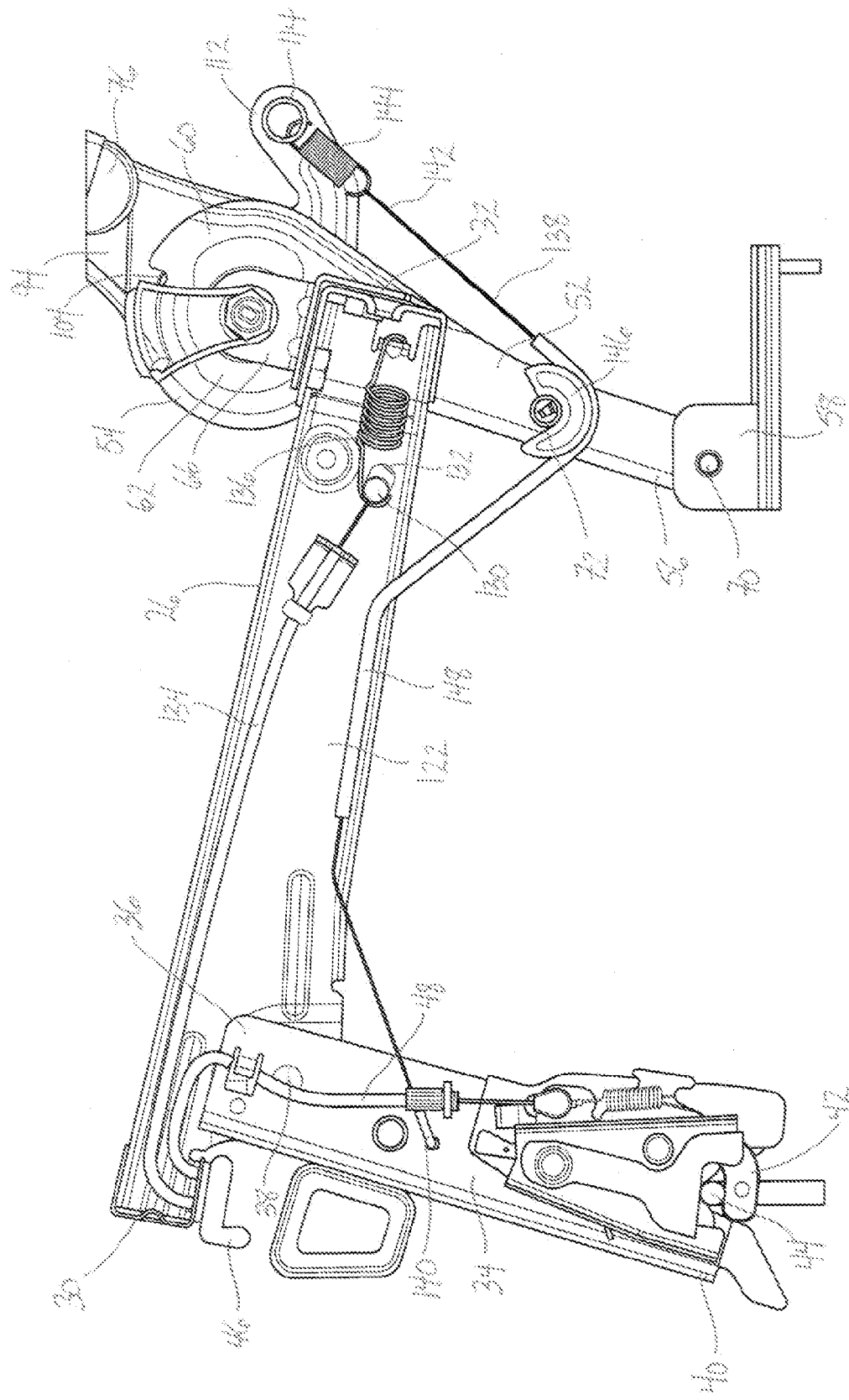
FIG. 7 is a fragmentary, partial cross-sectional side view of the rear seat assembly.

The lower end 76 of the seat back frame 28 is pivotally coupled to a pair of recliner brackets 94. The recliner brackets 94 extend between a first end 96 and a second end 98. The lower end 76 of the seat back frame 28 is pivotally coupled to the first end 96 of the recliner brackets 94 at pivot 100. The seat assembly 16 may include a seat back biasing spring (not shown) to bias the seat back 24 about the pivot 100 in a forward direction, away from the back wall 20, which is counterclockwise when viewed from FIG. 2. The second end 98 of the recliner brackets 94 is operatively coupled to an outer side 102 of the first end 54 of the rear legs 52. More specifically, a disc recliner 104, which is well known in the art, is coupled between the outer side 102 of the first end 54 of the rear legs 52 and the second end 98 of the recliner brackets 94. The disc recliners 104 define a recliner pivot axis 106 that is coaxial with the cushion pivot axis 68. The disc recliners 104 are selectively operable between a locked condition, preventing pivotal movement of the rear legs 52 relative to the recliner brackets 94 about the recliner pivot axis 106, and an unlocked condition, allowing pivotal movement of the rear legs 52 relative to the recliner brackets 94 about the recliner pivot axis 106. The disc recliners 104 are normally biased to the locked condition. The disc recliners 104 are selectively operable to the unlocked condition in response to actuating a recliner release handle (not shown) that is typically mounted on a shaft 110 of one of the disc recliners 104, as is well known in the art. A recliner cable (not shown) extends between the disc recliners 104 to synchronize actuation of the disc recliners 104 between the locked and unlocked conditions. The recliner brackets 94 include a torsion bar mount 112 that protrudes in the rearward direction away from the rearward end 32 of the seat cushion frame 26, as shown in FIG. 7. A torsion support tube 114 extends between the torsion bar mounts 112 and couples the recliner brackets 94 together.

The seat cushion frame 26 is pivotally locked relative to the recliner brackets 94 by a cushion latch mechanism 116. The cushion latch mechanism 116 includes a cushion latch 118 and a receiver bracket 120. The cushion latch 118 is pivotally coupled to a side member 122 of the seat cushion frame 26 at pivot 124 and the receiver bracket 120 is fixedly secured to one of the recliner brackets 94. The cushion latch 118 is generally L-shaped and includes one end having a hook 126 that engages a recess 128 in the receiver bracket 120 to pivotally lock the seat cushion frame 26 relative to the recliner brackets 94. The cushion latch 118 includes a post 130 extending in the lateral direction from an end of the cushion latch 118 opposite the hook 126. The post 130 extends through a slot 132 in the side member 122 of the seat cushion frame 26. The cushion latch 118 is selectively operable to disengage the hook 126 from the recess 128 in the receiver bracket 120. In response to actuating the stadium release handle 46. The stadium release handle 46 is operatively coupled to the cushion latch 118 with a Bowden-type cable 134 extending between the post 130 and the stadium release handle 46. When the hook 126 is disengaged from the recess 128, the seat cushion frame 26 is pivotable about the cushion pivot axis 68 relative to the recliner brackets 94. A return spring 136 is connected between the seat cushion frame 26 and the post 130 to bias the cushion latch 118 in a direction to engage the hook 126 with the recess 128 in the receiver bracket 120.

A cable 138 is routed between the torsion support tube 114 and one of the front legs 34 to pivot the front legs 34 from a support position to a retracted position in response to pivoting the seat cushion 22 about the cushion pivot axis 68 towards the seat back 24. In the retracted position, the front legs 34 are disposed adjacent to an underside of the seat cushion 22. The front legs 34 may be biased towards the support position. More specifically, a first end 140 of the cable 138 is coupled to one of the front legs 34 between the first end 36 and the second end 40. A second end 142 of the cable 138 is coupled to the torsion support tube 114 by an extension element, such as a cable spring 144. Between the first end 140 and the second end 142, the cable 138 is routed around a cable guide 146 and extends through a cable conduit 148 that is secured to the side member 122 of the seat cushion frame 26. The cable guide 146 is mounted on the cross-tube 72 extending between the rear legs 52. Thus, as the seat cushion 22 pivots about the cushion pivot axis 68 towards the seat back 24, an effective length of the cable 138 is reduced due to the fixed position of the cable guide 146 relative to the cushion pivot axis 68, thereby causing the front legs 34 to pivot about the pivot 38 towards the retracted position. Once the front legs 34 reach the retracted position, the cable spring 144 allows the seat cushion 22 to continue to rotate about the cushion pivot axis 68 toward the seat back 24 without unduly stressing the cable 138. It is appreciated that the cable spring 144 will also protect against abusive loading of the cable 138. For example, if an occupant attempts to pivot the front legs 34 out of the retracted position while the seat cushion 22 is adjacent to the seat back 24, the cable spring 144 will extend to protect the cable 138. In an alternative embodiment, the cable 138 may be replaced with a connecting link having a lost motion slot that operatively connects the front legs 34 and the rear legs 52 to pivot the front legs 34 to the retracted position in response to pivoting the seat cushion 22 about the cushion pivot axis 68 towards the seat back 24.

Figure 2:
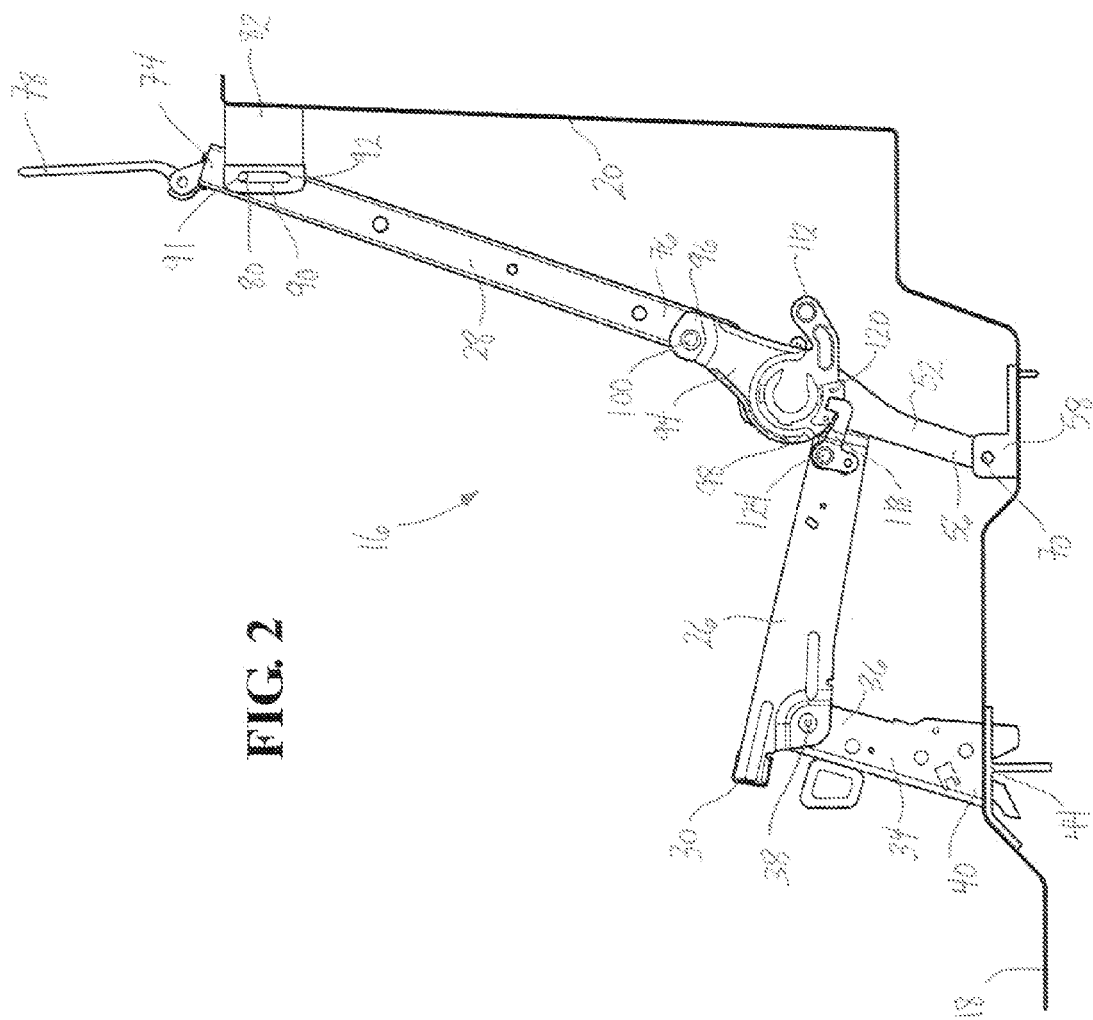
FIG. 2 is a side view of the rear seat assembly in a design seating position.

In operation, the seat assembly 16 is shown in FIG. 2 in a design, seating position, wherein the seat cushion 22 is supported generally horizontal in a raised position above the floor 18 and the seat back 24 is supported generally vertical in an upright position. The floor latches 42 are engaged with the floor strikers 44 to secure the second end 40 of the front legs 34 to the floor 18. The latch pins 80 are engaged with the slots 90 in the wall brackets 82 such that the upper end 74 of the seat back frame 28 is secured to the back wall 20 of the passenger cabin 12. In one embodiment, the latch pins 80 are disposed at the upper end 91 of the slots 90 when the seat assembly 16 is in the design seating position. The disc recliners 104 are in the locked condition to prevent pivotal movement of the rear legs 52 relative to the recliner brackets 94 about the recliner pivot axis 106. In addition, the hook 126 on the cushion latch 118 is engaged with the recess 128 in the receiver bracket 120 to prevent pivotal movement of the seat cushion 22 about the cushion pivot axis 68.

Figure 3:
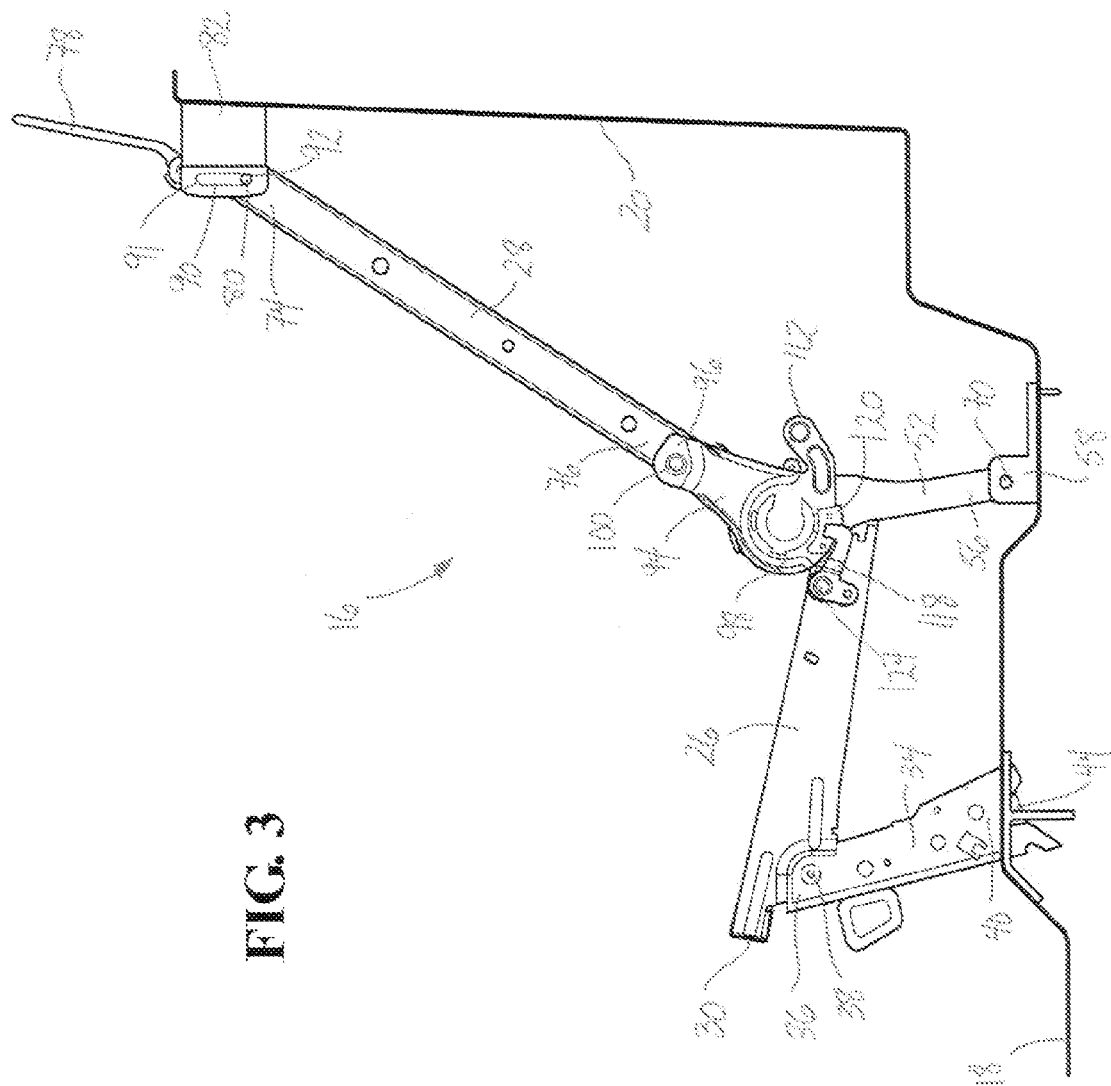
FIG. 3 is a side view of the rear seat assembly in a slouch position.

In order to move the seat assembly 16 from the design seating position to one of a plurality of slouch positions, one of which is shown in FIG. 3, the recliner release handle is lifted and the disc recliners 104 actuate to the unlocked condition to allow pivotal movement of the rear legs 52 relative to the recliner brackets 94 about the recliner pivot axis 106. With the disc recliners 104 in the unlocked condition, the front legs 34 and the rear legs 52 pivot in the forward direction, away from the back wall 20 (counterclockwise when viewed from FIGS. 2 and 3), in response to an input force from a seat occupant. More specifically, the front legs 34 pivot about the floor strikers 44 and the rear legs 52 pivot about the pivot 70, thereby moving the seat cushion 22 forwardly. Since the upper end 74 of the seat back frame 28 is coupled to the back wall 20, as the seat cushion 22 moves forwardly, the pivot 100 between the lower end 76 of the seat back frame 28 and the first end 96 of the rectifier brackets 94 allows the seat back 24 to effectively recline. The latch pins 80 move downward within the slots 90 in the wall brackets 82 as the seat back 24 reclines. Once the seat assembly 16 is in the desired slouch position, the recliner release handle is released to allow the disc recliners 104 to return to the locked condition, which thereby prevents any further movement of the seat assembly 16. The plurality of slouch positions is limited by the lower end 92 of the slots 90 in the wall brackets 82. For example, as the seat back 24 reclines the latch pins 80 will reach the lower end 92 of the slots 90, thereby preventing the seat back 24 from reclining any further and thereby limiting the plurality of slouch positions.

To return the seat assembly 16 from the slouch position to the design seating position, the recliner release handle is again lifted and the disc recliners 104 actuate to the unlocked condition. With the disc recliners 104 in the unlocked condition, the front legs 34 and the rear legs 52 pivot in the rearward direction, towards the back wall 20 (clockwise when viewed from FIG. 3), in response to another input force from the seat occupant. The leg biasing spring will also urge the rear legs 52 about the pivot 70 in the rearward direction. More specifically, the front legs 34 pivot about the floor strikers 44 and the rear legs 52 pivot about the pivot 70, thereby moving the seat cushion 22 rearwardly. Since the upper end 74 of the seat back frame 28 is coupled to the back wall 20, as the seat cushion 22 moves rearwardly, the pivot 100 between the lower end 76 of the seat back frame 28 and the first end 96 of the recliner brackets 94 allows the seat back 24 to return to the upright position. The latch pins 80 move upward within the slots 90 in the wall, brackets 82 as the seat back 24 returns to the upright position. Once the seat assembly 16 is in the design seating position, the recliner release handle is released to allow the disc recliners 104 to return to the locked condition, which thereby prevents any further movement of the seat assembly 16.

Figure 4:
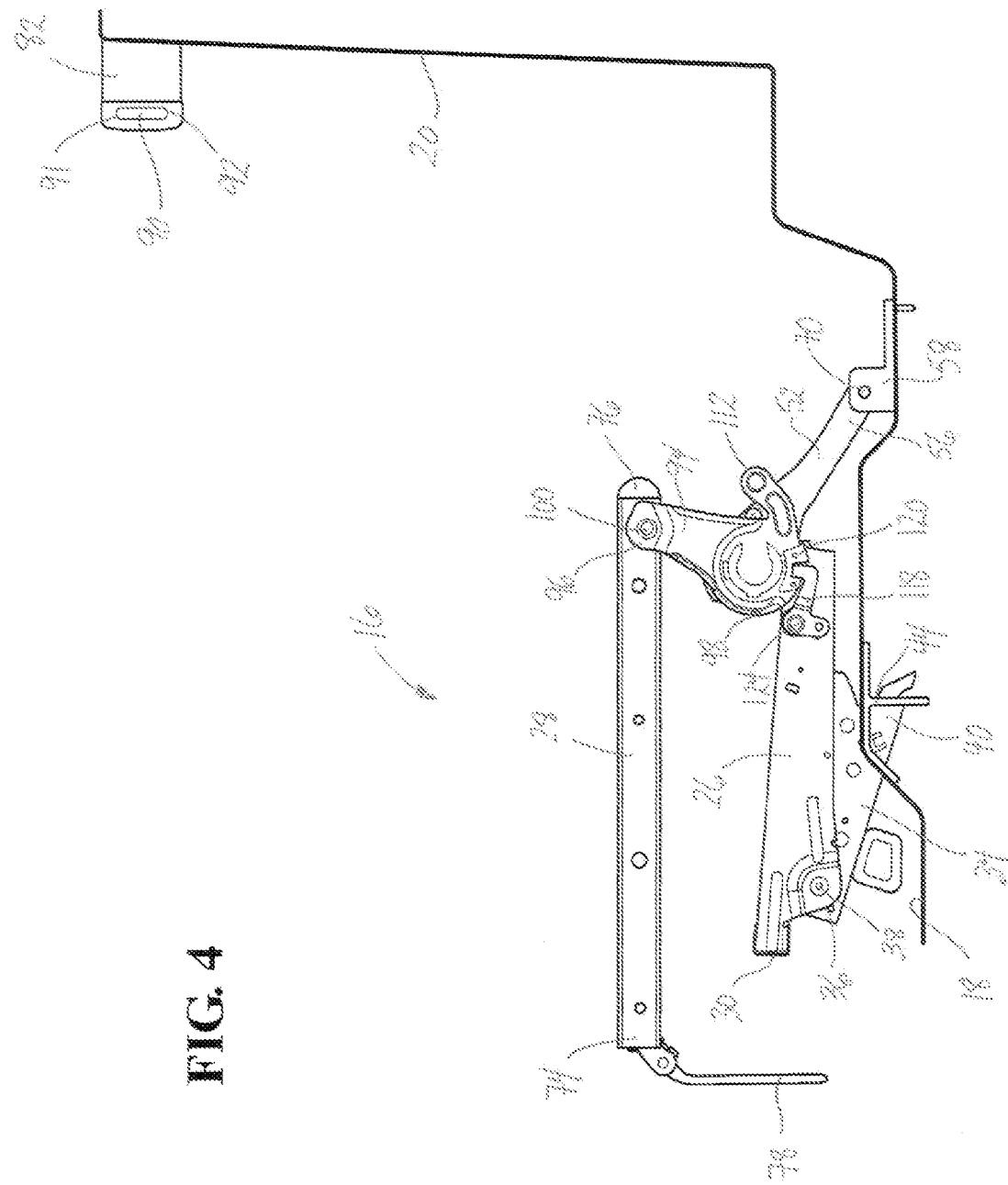
FIG. 4 is a side view of the rear seat assembly in a fold and kneel position.

In order to move the seat assembly 16 from the design seating position to a fold and kneel position, shown in FIG. 4, the fold flat release handle 93 is lifted and the latch pins 80 retract from the slots in the wall brackets 82, thereby releasing the upper end 74 of the seat hack frame 28 from the hack wall 20. The seat back 24 then pivots forwardly about the pivot 100 toward the seat cushion 22 in response to the seat back biasing spring. Once the seat back 24 reaches a predetermined position, a cable (not shown) operatively coupled between the seat back 24 and the disc recliners 104 actuates the disc recliners 104 to the unlocked condition. With the disc recliners 104 in the unlocked condition, the weight of the seat assembly 16 causes the front legs 34 and the rear legs 52 to pivot in the forward direction, away from the back wall 20 (counterclockwise when viewed from FIGS. 2 and 4). More specifically, the front legs 34 pivot about the floor strikers 44 and the rear legs 52 pivot about the pivot 70, thereby moving the seat cushion 22 forwardly and downwardly. The seat back 24 continues to pivot forwardly until the seat back 24 is adjacent to the seat cushion 22 and the seat cushion 22 continues to move forwardly and downwardly until the seat cushion 22 is adjacent to the floor 18. Since the leg biasing spring urges the rear legs 52 in the rearward direction (clockwise when viewed from the Figures), it is appreciated that the leg biasing spring will help counteract the weight of the seat assembly 16 as the seat assembly 16 is lowered towards the floor 18. It is further appreciated that as the seat back 24 is folded against the seat cushion 22, the head restraint 78 may automatically actuate from the upright use position to the folded stowed position.

To return the seat assembly 16 from the fold and kneel position to the design seating position, a portion of the seat assembly 16 is lifted to move the seat cushion 22 upwardly and rearwardly to the raised position. As the seat cushion 22 moves upwardly and rearwardly, the front legs 34 and the rear legs 52 pivot in the rearward direction, towards the back wall 20 (clockwise when viewed from FIG. 4). More specifically, the front legs 34 pivot about the floor strikers 44 and the rear legs 52 pivot about the pivot 70. It is appreciated that movement of the seat cushion 22 to the raised position is assisted by the leg biasing spring urging the rear legs 52 in the rearward direction. Once the seat cushion 22 reaches the raised position, the disc recliners 104 return to the locked condition. It is contemplated that the disc recliners 104 may include a memory feature corresponding to the raised position such that the disc recliners 104 automatically return to the locked condition when the seat cushion 22 reaches the raised position. With the disc recliners 104 in the locked condition, the seat back 24 is then pivoted rearwardly about the pivot 100 towards the back wall 20. As the seat, back 24 pivots towards the back wall 20, the chamfered edge 84 of the latch pins 80 contacts the outer segment 86 of the wall brackets 82, which pushes the latch, pins 80 inwardly. The seat back 24 continues to pivot towards the back wall 20 until the latch pins 80 are aligned with the slots 90, thereby allowing the latch pins 80 to return to the extended position and engage the slots 90 in the wall brackets 82. With the disc recliners 104 in the locked condition and the upper end 74 of the seat back frame 28 secured to the back wall 20, any further movement of the seat assembly 16 is prevented. It is contemplated that if the seat assembly 16 is lifted by the seat back 24, the spring force of the seat back biasing spring is such that the seat cushion 22 will return to the raised position and the disc recliners 104 will return to the locked condition before the seat back 24 begins to pivot about the pivot 100. In one alternative, an interlock may be used such that the seat back 24 will not pivot about the pivot 100 until the seat cushion 22 reaches the raised position and the disc recliners 104 actuate to the locked condition.

Figure 5:
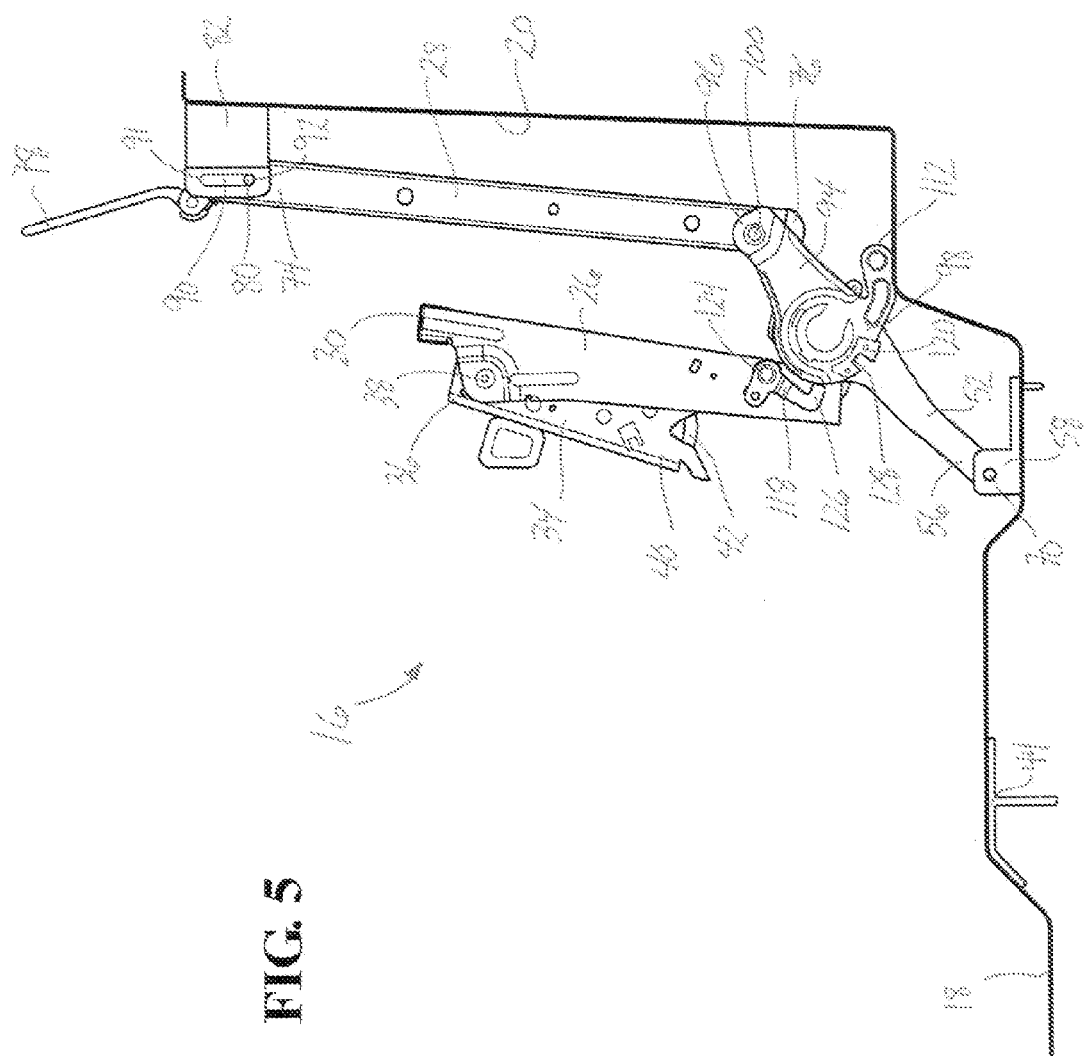
FIG. 5 is a side view of the rear seat assembly in a stadium position.

In order to move the seat assembly 16 from the design seating position to a stadium position, shown in FIG. 5, the stadium release handle 46 is lifted and the cable 48 actuates the floor latches 42 to disengage from the floor strikers 44, thereby releasing the front legs 34 from the floor 18. As the stadium release handle 46 continues to be lifted, the hook 126 of the cushion latch 118 disengages from the recess 128 in the receiver bracket 120 to unlock the seat cushion frame 26 from the recliner brackets 94. With the front legs 34 released from the floor 18 and the seat cushion frame 26 unlocked from the recliner brackets 94, the seat cushion 22 is free to pivot about the cushion pivot axis 68 towards the seat back 24. It is contemplated that a seat cushion biasing spring (not shown) may urge the seat cushion 22 to pivot rearwardly about the cushion pivot axis 68 without varying from the scope of the invention. As the seat cushion 22 pivots rearwardly about the cushion pivot axis 68, the effective length of the cable 138 is reduced, thereby causing the front legs 34 to pivot about the pivot 38 towards the retracted position. At the same time, the rear legs 52 pivot about the pivot 70 in the rearward direction, towards the back wall 20 (clockwise when viewed from FIGS. 2 and 5), thereby moving the lower end 76 of the seat back frame 28 towards the back wall 20. It is appreciated that pivotal movement of the rear legs 52 in the rearward direction is assisted by the leg biasing springs. As the lower end 76 of the seat back frame 28 moves towards the back wall 20, the latch pins 80 move downward within the slots 90 in the wall brackets 82. In one embodiment, the latch pins 80 are disposed at the lower end 92 of the slots 90 when the seat assembly 16 is in the stadium position.

To return, the seat assembly 16 from the stadium position to the design seating position, the seat cushion 22 is pivoted forwardly about the cushion pivot axis 68 away from the seat back 24. As the seat cushion 22 pivots forwardly about the cushion pivot axis 68, the effective length of the cable 138 is increased, thereby allowing the front legs 34 to pivot about the pivot 38 towards the support position. At the same time, the rear legs 52 pivot about the pivot 70 in the forward direction, away from the back wall 20 (counterclockwise when viewed from FIG. 5), thereby moving the lower end 76 of the seat back frame 28 away from the back wall 20. As the lower end 76 of the seat back frame 28 moves away from the back wall 20, the latch pins 80 move upward within the slots 90 in the wall brackets 82. As the seat cushion 22 continues to pivot forwardly about the cushion pivot axis 68, the hook 126 of the cushion latch 118 engages the recess 128 in the receiver bracket 120 to pivotally lock the seat cushion frame 26 relative to the recliner brackets 94. The rear legs 52 continue to pivot about the pivot 70 in the forward direction until the floor latches 42 engage with the floor strikers 44, thereby securing the front legs 34 to the floor 18.

The invention has been described herein in an illustrative manner, and it is to be understood that the terminology used is intended to be in the nature of words of description rather than limitation. Many modifications and variations of the present Invention are possible in light of the above teachings. It is, therefore, to be understood that, within the scope of the appended claims, the invention may be practiced other than as specifically enumerated within the description.

What is claimed:

1. A seat assembly for a vehicle, the vehicle having a floor and a back wall, said seat assembly comprising:

a seat cushion;

a seat back;

a front leg extending between a first end pivotally coupled to said seat cushion and a second end releasably coupled to the floor;

a rear leg extending between a first end pivotally coupled to said seat cushion and a second end pivotally coupled to the floor;

a recliner bracket, wherein said seat back is pivotally coupled to said recliner bracket, and wherein said seat cushion is selectively locked relative to said recliner bracket to prevent pivotal movement of said seat cushion relative to said recliner bracket; and a disc recliner operatively coupling said recliner bracket and said second end of said rear leg, said disc recliner is selectively operable between a locked condition, preventing pivotal movement of said rear leg relative to said recliner bracket, and an unlocked condition, allowing pivotal movement of said rear leg relative to said recliner bracket;

wherein said disc recliner is actuated to said unlocked condition to allow said front and rear legs to pivot forwardly, away from the back wall, thereby reclining said seat back as said seat assembly moves from a design seating position to a slouch position;

wherein said seat back is pivoted towards said seat cushion and said recliner is actuated to said unlocked condition to allow said front and rear legs to pivot forwardly, thereby lowering said seat assembly towards the floor as said seat assembly moves from said design seating position to a fold and kneel position;

wherein said front leg is released from the floor and said cushion latch mechanism is unlocked to allow said seat cushion to pivot towards said seat back as said seat assembly moves from said design seating position to a stadium position; and wherein a pivotal connection between said first end of said rear leg and said seat cushion defines a cushion pivot axis and said disc recliner defines a recliner pivot axis, and wherein said cushion pivot axis and said recliner pivot axis are coaxial.

2. The seat assembly as set forth in claim 1 wherein said rear leg pivots about said recliner pivot axis relative to said recliner bracket as said seat assembly moves from said design seating position to said slouch position.

3. The seat assembly as set forth in claim 2 wherein said seat back pivots relative to said recliner bracket and said rear leg pivots about said recliner pivot axis relative to said recliner bracket as said seat assembly moves from said design seating position to said fold and kneel position.

4. The seat assembly as set forth in claim 3 including a cushion latch mechanism selectively locking said seat cushion to said recliner bracket to prevent pivotal movement of said seat cushion relative to said recliner bracket, wherein said cushion latch mechanism remains locked such that said seat cushion does not pivot relative to said recliner bracket as said seat assembly moves from said design seating position to said slouch position and as said seat assembly moves from said design seating position to said fold and kneel position.

5. The seat assembly as set forth in claim 4 wherein said seat cushion pivots about said cushion pivot axis towards said seat back as said seat assembly moves from said design seating position to said stadium position.

6. The seat assembly as set forth in claim 5 wherein said disc recliner automatically actuates to said unlocked condition in response to pivoting said seat back towards said seat cushion as said seat assembly moves from said design seating position to said fold and kneel position.

7. The seat assembly as set forth in claim 6 wherein said front leg automatically pivots from a support position, extending generally perpendicular to said seat cushion, to a retracted position, extending generally parallel to said seat cushion, as said seat cushion pivots towards said seat back.

8. The seat assembly as set forth in claim 7 wherein said seat back extends between an upper end and a lower end, wherein said upper end of said seat back is adapted to be slidably and releasably coupled to the back wall, and wherein said lower end of said seat back is pivotally coupled to said recliner bracket at a point other than at said recliner pivot axis.

9. The seat assembly as set forth in claim 8 wherein said seat back includes a latch pin, wherein said latch pin is biased to an extended position for engaging a wall bracket adapted to be mounted on the back wall, and wherein said latch pin is selectively retractable for disengaging from said wall bracket.

10. The seat assembly as set forth in claim 9 wherein said wall bracket includes a slot extending generally vertically, said latch pin is engaged with said slot when said seat assembly is in said design seating position, said slouch position, and said stadium position, and said latch pin is disengaged from said slot when said seat assembly is in said fold and kneel position.

11. The seat assembly as set forth in claim 10 wherein said slot extends between an upper end and a lower end, said latch pin is disposed at an upper end of said slot when said seat assembly is in said design seating position, said latch pin is disposed away from said upper end of said slot when said seat assembly is in said slouch position, and said latch pin is disposed at said lower end of said slot when said seat assembly is in said stadium position.

12. The seat assembly as set forth in claim 10 wherein said second end of said front leg includes a floor latch selectively engageable with the floor.

13. The seat assembly as set forth in claim 12 wherein said cushion latch mechanism includes a cushion latch pivotally coupled to said seat cushion, said cushion latch engaging a recess on said recliner bracket to lock said seat cushion to said recliner bracket to prevent pivotal movement of said seat cushion relative to said recliner bracket.

14. The seat assembly as set forth in claim 13 wherein said cushion latch is biased to engage with said recess on said recliner bracket.

15. The seat assembly as set forth in claim 14 including a stadium release handle operatively coupled to said floor latch and operatively coupled to said cushion latch, wherein actuating said stadium release handle releases said floor latch from the floor and releases said cushion latch from said recess, thereby allowing said seat cushion to pivot about said cushion pivot axis towards said seat back.

16. The seat assembly as set forth in claim 15 wherein a cable is operatively coupled between said recliner bracket and said front leg such that an effective length of said cable is reduced as said seat cushion pivots towards said seat back, thereby causing said front leg to automatically pivot from said support position to said retracted position.

17. The seat assembly as set forth in claim 16 wherein said disc recliner can be actuated to said locked condition at any of a plurality of slouch positions.

18. The seat assembly as set forth in claim 17 wherein said rear leg pivots rearwardly, towards the back wall, as said seat assembly moves from said design seating position to said stadium position thereby moving said lower end of said seat back towards the back wall.

19. A seat assembly for a vehicle, the vehicle having a floor and a back wall, said seat assembly comprising:
a seat cushion supported above the floor;
a seat back;
a rear leg operatively coupled between said seat cushion and the floor;
a recliner bracket, wherein said seat back is pivotally coupled to said recliner bracket, and wherein said seat cushion is selectively locked relative to said recliner bracket to prevent pivotal movement of the seat cushion relative to the recliner bracket; and
a disc recliner operatively coupling said recliner bracket and said rear leg, said disc recliner selectively operable between a locked condition, preventing pivotal movement of said rear leg relative to said recliner bracket, and an unlocked condition, allowing pivotal movement of said rear leg relative to said recliner bracket;
wherein said disc recliner is actuated to said unlocked condition to allow said rear leg to pivot forwardly, away from the back wall, thereby reclining said seat back as said seat assembly moves from a design seating position to a slouch position;
wherein said seat back is pivoted towards said seat cushion and said recliner is actuated to said unlocked condition to allow said rear leg to pivot forwardly, thereby lowering said seat assembly towards the floor as said seat assembly moves from said design seating position to a fold and kneel position;
wherein said seat cushion is unlocked relative to said recliner bracket to allow said seat cushion to pivot towards said seat back as said seat assembly moves from said design seating position to a stadium position; and
wherein a pivotal connection between said first end of said rear leg and said seat cushion defines a cushion pivot axis an said disc recliner defines a recliner pivot axis, and wherein said cushion pivot axis and said recliner pivot axis are coaxial.

\* \* \* \* \*